United States Patent
Goldin

(10) Patent No.: US 6,247,200 B1
(45) Date of Patent: Jun. 19, 2001

(54) SCRAPER MOUNTING APPARATUS FOR EXTENSIBLE MACHINE SLIDEWAY GUARDS AND A RELATED CONSTRUCTION METHOD

(75) Inventor: Walter Goldin, Laives (IT)

(73) Assignee: P.E.I. Protezioni Elaborazioni Industriali S.r.l., Bologna (IT)

( * ) Notice: Subject to any disclaimer, the term of this patent is extended or adjusted under 35 U.S.C. 154(b) by 0 days.

(21) Appl. No.: 09/408,214

(22) Filed: Sep. 29, 1999

(30) Foreign Application Priority Data

Sep. 30, 1998 (IT) ............................... B098A0555

(51) Int. Cl.[7] ............................. B23G 11/08; F16C 17/00
(52) U.S. Cl. ............................... 15/256.5; 15/246; 384/15
(58) Field of Search ................................. 15/246, 256.5; 160/11, 202, 222; 29/DIG. 94; 220/8; 277/343, 550, 551, 576; 384/15; 409/134

(56) References Cited

U.S. PATENT DOCUMENTS

| | | | |
|---|---|---|---|
| 2,555,223 | * | 5/1951 | Cox . |
| 3,515,444 | * | 6/1970 | Grabner . |
| 4,099,798 | * | 7/1978 | Steinmetz . |
| 4,254,531 | * | 3/1981 | Henning et al. ............ 15/256.5 |
| 6,052,859 | * | 4/2000 | Diels .......................... 15/256.5 |

* cited by examiner

Primary Examiner—Terrence R. Till
(74) Attorney, Agent, or Firm—Fay, Sharpe, Fagan, Minnich & McKee, LLP

(57) ABSTRACT

An apparatus on which scrapers for extensible machine slideway guards are mounted comprises a mounting frame consisting of a plurality of single lengths of section fitted together in pairs where the two lengths meet at one corner; and connecting squares having first contact faces which lie flat against opposing perimetric faces of the lengths of section. The lengths of section have a longitudinal groove in which the scrapers are retained and from which the scrapers extend outwards towards a contiguous slideway. The squares are positioned on the frame close to the corners and comprise second faces that are in contact with the scrapers and that, together with the perimetric faces of the lengths of section, form a gap contiguous to the squares. The ends of two adjacent scrapers are held together firmly and permanently within this gap. The invention also relates to a method for constructing the frame.

17 Claims, 2 Drawing Sheets

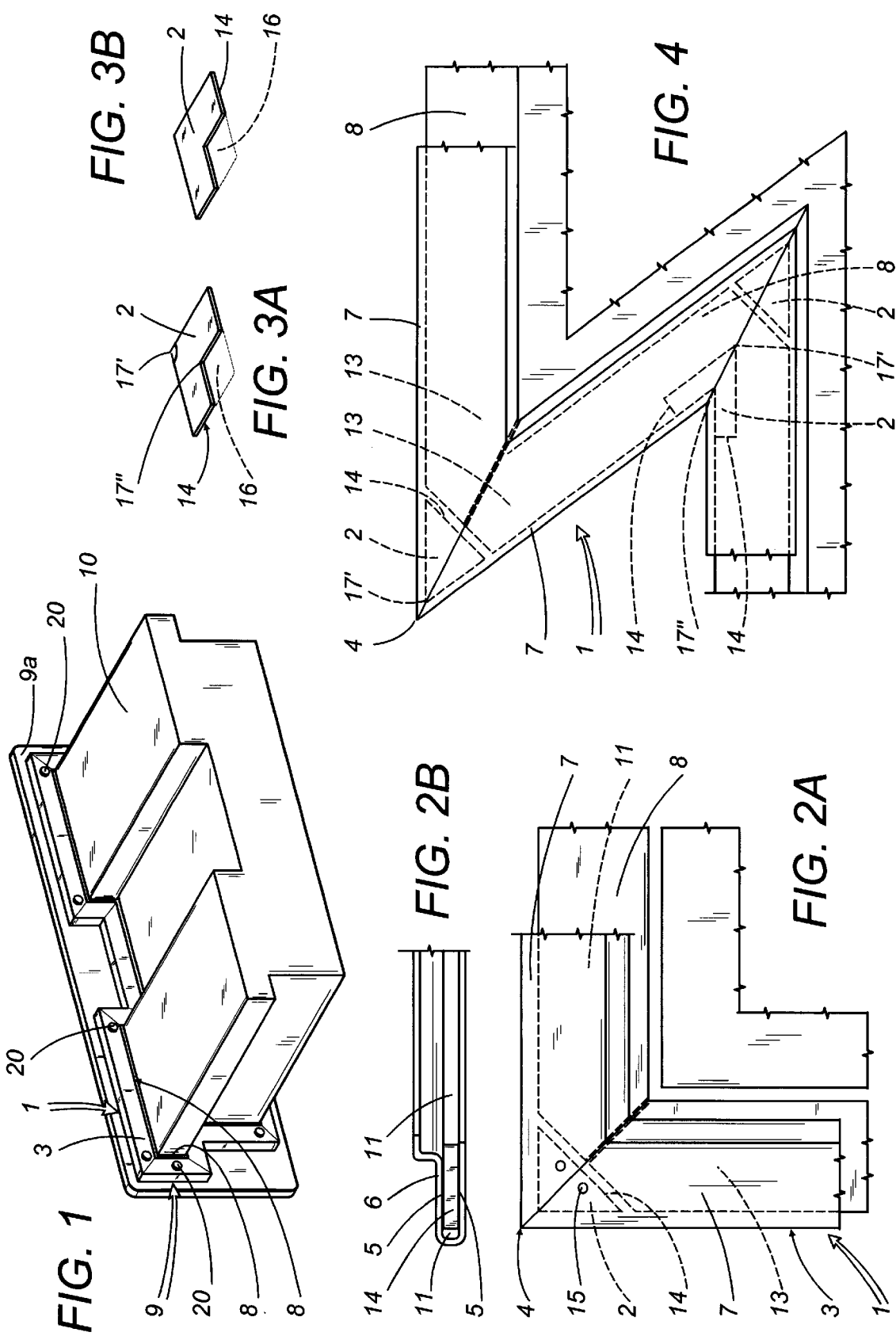

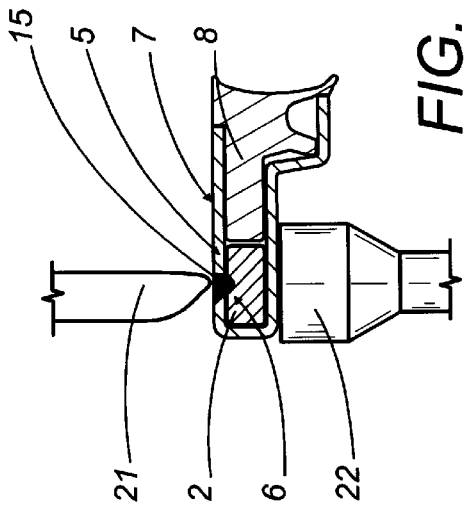
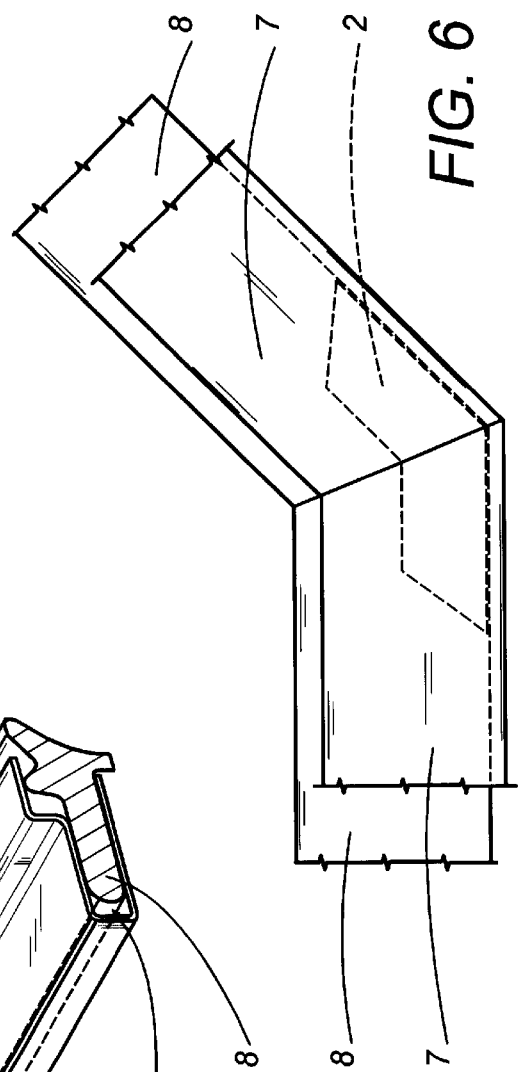
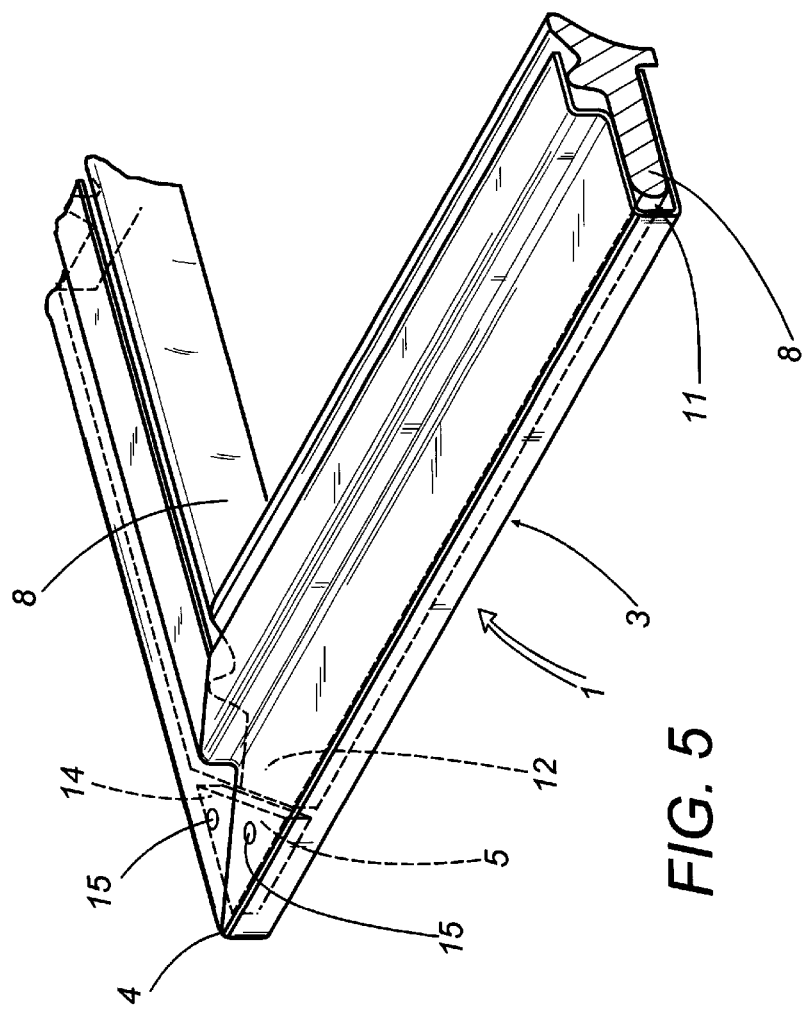

SCRAPER MOUNTING APPARATUS FOR EXTENSIBLE MACHINE SLIDEWAY GUARDS AND A RELATED CONSTRUCTION METHOD

BACKGROUND OF THE INVENTION

The present invention relates to extensible, scraping guards used especially to protect machine slideways and in particular to an apparatus on which the scrapers are mounted and to a related construction method.

In the mechanical engineering sector, a common problem connected with the use of certain types of chipforming machine tools and certain types of manipulators and mobile robotized systems is how to protect some of the moving parts against damage due to the combined action of chippings, dust and lubricating coolants from the cutting areas.

To protect against damage of this kind, machines are usually fitted with scraping guards consisting basically of a metal casing that is connected to a moving part of the machine and that has an oil scraper made of an elastically yielding material (for example, polyurethane). The oil scraper projects from the casing against the adjacent fixed part of the machine, for example, a slideway and scrapes it as the machine moves. In this way, it fills the space in the slideway in which the machine runs, preventing dirt from getting into it, and as it moves, also removes foreign matter from the surface of the slideway.

Scraping guards of this kind, called simply scrapers by experts in the trade, are usually applied to the moving part of the machine and are shaped to match the shape of the slideway on which the movable part of the machine runs, with an outer edge that fits the slideway exactly so as to keep the surface of the slideway clean not only by scraping off any dirt deposits but also by preventing chippings and other foreign matter from making their way into the slideway.

An apparatus of this kind, corresponding substantially to the preamble to claim 1, and described also in patent publication U.S. Pat. No. 4,254,531, comprises a frame which holds the scrapers and which consists of a plurality of single lengths of section fitted together in pairs where the two lengths meet at one corner, and connecting squares having first contact faces which lie flat against opposing perimetric faces of the lengths of section, these lengths of section having a longitudinal groove in which the scrapers are retained and from which they extend outwards towards a metal case adjacent to the case that mounts the apparatus.

The main advantage of using connecting squares to connect up the parts of the scraper is that they allow frames with complex shapes to be made to match the shapes of different types of slideways, including L-, Z- and Omega-shaped slideways.

However, in the known solution, the lengths of section are made from extruded aluminum alloy and, in order to confer sufficient stiffness on the frame as a whole but without unduly increasing the contact pressure between the squares and the perimetric faces of the sections, the squares used have large surfaces with rather long, cumbersome arms. Moreover, the lengths of section are shaped in such a way as to present internal cavities in which the squares are press fitted and the fit then reinforced by punching and or spot welding.

Finally, to securely attach the scrapers to each other at the join between two contiguous sections, some additional, separate connecting elements, housed inside the scrapers themselves, are used.

In another solution known to experts in the trade, the mounting frames are made by welding the lengths of section directly to each other without using connecting squares. This solution is especially designed to confer adequate rigidity and strength on the structural connections, especially when the frame is made from lengths of steel section. However, the disadvantage of this solution is that, especially in the case of frames with complex shapes, welding the parts together produces thermal expansion and causes considerable deformation. As a result, once the frame has been welded, a lengthy and complex straightening operation is inevitably required to confer a degree of precision to match the precision typical of the shape of the slideways that the guards are used on. This considerably increases the cost of the finished product.

The aim of the present invention is to overcome the above mentioned disadvantages and to combine flexibility, as can be attained with the connecting squares, with the strength and rigidity of welded steel constructions while at the same time avoiding the drawbacks due to the constructional complexity and thermal expansion typical of the two main types of conventional solutions described above.

SUMMARY OF THE INVENTION

According to the present invention, these and other aims are achieved by a scraper mounting apparatus of the type described in the preamble to claim 1, wherein the connecting squares are positioned at the corners of the frame and each of which comprises a face that contacts the scrapers and that, in conjunction with the perimetric faces of the lengths of section, forms a gap contiguous to the square itself; the ends of two adjacent scrapers being held together firmly and permanently within this gap.

The squares are housed preferably in the groove that also houses the scrapers, and this has the advantage of greatly simplifying the design of the connected sections.

Moreover, the lengths of metal section and the squares are joined by spot welding which, on steel sections and squares, does not produce significant deformation on the frame of the mounting apparatus.

According to the present invention, the above mentioned aims are also achieved by a method for constructing a frame to mount scraping lips for extensible guards, which comprises the following steps:

interconnecting a plurality of lengths of section in pairs at a corner of the mounting frame, using at least one face of connecting squares located on the frame in a position contiguous to the corner;

shaping the ends of scraping lips to match the shape of a second contact face of the square so that it makes good contact with the scraper elements;

inserting the scrapers into a longitudinal groove made in the lengths of section to retain the scrapers in such a way that they project from the groove;

sliding the scrapers along the longitudinal groove until the ends of the scrapers come into contact with the second, contact face of the square, the scrapers being held firmly and permanently within a gap contiguous to the square and formed by the square and at least one perimetric face of the lengths of section.

BRIEF DESCRIPTION OF THE DRAWINGS

The technical features of the present invention, in accordance with the above mentioned aims, are set out in the claims herein and the advantages more clearly illustrated in the detailed description which follows, with reference to the accompanying drawings, which illustrate preferred embodiments of the invention without restricting the scope of the inventive concept and in which:

FIG. 1 is a schematic, perspective assembly view of an extensible machine slideway guard equipped with a scraper mounting apparatus made in accordance with the present invention, and acting on a slideway;

FIGS. 2A and 2B are, respectively, a top plan view and an elevation view of a detail of the apparatus illustrated in FIG. 1;

FIGS. 3A and 3B are plan views of a detail of the invention in two embodiments;

FIG. 4 is an assembly view of another embodiment of the apparatus illustrated in FIG. 2A;

FIG. 5 is a perspective assembly view of the apparatus illustrated in FIGS. 2A and 2B;

FIG. 6 illustrates yet another embodiment of the apparatus made according to the present invention;

FIG. 7 is a schematic cross section of a scraper mounting apparatus during a welding operation.

DESCRIPTION OF THE PREFERRED EMBODIMENTS

With reference to FIG. 1, the numeral 1 indicates as a whole an apparatus that mounts scrapers 8, used in extensible guards for general mechanical applications, in particular the guards for the slideways of the moving parts of machine tools, machining centers, robotized systems and similar equipment.

The apparatus 1 essentially comprises a mounting frame 3 which is attached by a plurality of screws 20 to a movable part 9a (illustrated schematically) of the machine and which mounts the scrapers 8 extending outwards towards a contiguous slideway 10 with which the scrapers 8 are in sliding contact.

The frame 3 that mounts the scrapers 8 consists of a plurality of single lengths of section 7 fitted together in pairs, where the two lengths meet at one corner 4 of the frame 3, and joined by connecting squares 2 located at the relative joining area.

The lengths of section 7 have preferably a substantially U-shaped cross section and have a longitudinal groove 11 in which the scrapers 8 are retained and from which the scrapers 8 extend outwards towards the adjacent slideway 10.

The longitudinal groove 11, where it is contiguous to the corners 4 of the frame 3, also accommodates the connecting squares 2 of the lengths of section 7.

The squares 2, like the lengths of section 7, are made preferably of steel and are prismatic in shape, with a height corresponding to the width of the longitudinal groove 11 (FIG. 2B) and a substantially triangular polygonal base, whose angle at the vertex 17' may vary according to requirements (FIGS. 2A and 4) and which may have lightened areas 16 made in the triangular base (FIGS. 3A, 3B and 4) and forming a second vertex 17".

The connecting squares 2 have a pair of first, flat, parallel contact faces 5, which lie flat against opposite perimetric faces 6 of the sections 7, and have also a second face 14 which is in contact with the scrapers, at right angles to the first faces 5, and which, in the case of prismatic squares with triangular profile, extends from the base of the base triangle.

As shown in FIGS. 2a, 4 and 5, when the frame 3 is constructed, the square 2 is fitted in the area where two contiguous lengths of section 7 are joined, over the two lengths of section 7 at the corner 4 of the frame 3 (FIG. 5). In this position, as shown in FIGS. 2b and 7, the square 2 is then fixed permanently by spot 15 welding using a suitable spot welder with a flat rest 21 and a pointed welding tip 22 placed on opposite sides of the section 7 in such a way as to make the spot welds to connect one or both of the first contact faces 5 with the corresponding perimetric face or faces 6 on the lengths of section 7.

This feature, together with the fact that the surface of the base of the square 2 may be very small, since the parts whose contact surfaces are to be connected are made of steel, makes it possible to create inside the groove 11 a gap 12, contiguous to the square 2, delimited by the second face 14 and the perimetric faces 6 of the sections 7, and in which the ends 13 of two scrapers 8 belonging to adjacent sections 7 are retained firmly and permanently.

Obviously, the ends 13 of the scrapers 8, before they are inserted into the groove 11, must be suitably shaped to match the shape of the second face 14 and according to the orientation of the latter at the joining area.

This operation, however, does not present any particular difficulties and can be done quickly and easily not only if the ends have to be both tapered to contact a single flat face 14, as shown in FIGS. 2a and 5, but also if they have to contact second faces 14 with lightened areas 16, as illustrated at the bottom of FIG. 4.

The apparatus 1 disclosed herein has an extremely simple structure, which makes it economical and easy to manufacture and permits a wide range of section frames 3 to be made easily, even in complex shapes: for example, where the corners 4 make right angles (FIG. 2a), obtuse angles (FIG. 6) or acute angles (FIG. 4). In the case of acute angles, FIG. 4 shows that Z-shaped or dovetail frames 3 can be made by combining squares 2 of different sizes and with different vertex angles 17", fitting them, when they are adjacent, if necessary with the vertices 17' facing opposite directions, and locating them in such a way that the scrapers 8 are positioned along an uninterrupted broken line.

According to the present invention, a mounting frame 3 can be constructed using a method that basically comprises the following steps:

interconnecting a plurality of lengths of section 7 in pairs at a corner 4 of the mounting frame 3, using at least one face 5 of connecting squares 2 located on the frame 3 in a position contiguous to the corner 4;

shaping the ends 13 of the scraping lips 8 to match the shape of a second contact face 14 of the square 2 so that it makes good contact with the scraper elements 8;

inserting the scrapers 8 into the longitudinal groove 11 made in the lengths of section 7 to retain the scrapers 8 in such a way that they project from the groove 11;

sliding the scrapers 8 along the longitudinal groove 11 until the ends 13 of the scrapers 8 come into contact with the second, contact face 14 of the square 2, the scrapers 8 being held firmly and permanently within the gap 12 formed by the square 2 and the perimetric faces 6 of the lengths of section 7

The invention described can be subject to modifications and variations without thereby departing from the scope of the inventive concept. Moreover, all the details of the invention may be substituted by technically equivalent elements.

What is claimed:

1. An apparatus on which scrapers for extensible machine slideway guards are mounted comprising a mounting frame which consists of a plurality of single lengths of section fitted together in pairs where the two lengths meet at one corner of the frame and connecting squares having first contact faces which lie flat against opposing perimetric faces of the lengths of section, said lengths of section having a longitudinal groove in which the scrapers are retained and from which the scrapers extend outwards towards a contiguous slideway, wherein the connecting squares are positioned at the corners of the frame and each of which comprises a face that contacts the scrapers and that, in conjunction with the perimetric faces of the lengths of section, forms a gap contiguous to the square itself; the ends of two adjacent scrapers being held together firmly and permanently within this gap.

2. The apparatus according to claim 1, wherein the connecting squares are housed inside the longitudinal groove.

3. The apparatus according to claim 1, wherein the second contact face is a single face oriented in such a way that it contacts both the scraper ends at one corner at the same time.

4. The apparatus according to claim 3, wherein the second face is flat and the ends of the scrapers are shaped to match said second face.

5. The apparatus according to claim 1, wherein a single first contact face, or each first contact face, and the perimetric faces are rigidly connected to each other by spot welding.

6. The apparatus according to claim 1, wherein the first contact face of the square is polygonal in shape.

7. The apparatus according to claim 6, wherein the first contact face of the square is triangular in shape.

8. The apparatus according to claim 1, wherein the adjacent squares on the frame are mounted in such a way that the vertex angles face opposite directions.

9. The apparatus according to claim 1, wherein the squares are housed in the groove which also accommodates the scrapers.

10. The apparatus according to claim 1, wherein the square has two first faces to contact the corresponding perimetric faces of the lengths of section.

11. The apparatus according to claim 10 wherein the first contact faces are flat and parallel with each other.

12. The apparatus according to claim 1, wherein the lengths of section and the connecting squares are made of steel.

13. A method for making a scraper mounting frame for telescopic guards with parts that slide relative to each other, comprising the following steps:

interconnecting a plurality of lengths of section in pairs at a corner of the mounting frame, using at least one face of connecting squares located on the frame in a position contiguous to the corner;

shaping the ends of scraping lips to match the shape of a second contact face of the square so that it makes good contact with the scraper elements;

inserting the scrapers into a longitudinal groove made in the lengths of section to retain the scrapers in such a way that they project from the groove;

sliding the scrapers along the longitudinal groove until the ends of the scrapers come into contact with the second, contact face of the square, the scrapers being held firmly and permanently within a gap contiguous to the square and formed by the square and at least one perimetric face of the lengths of section.

14. The method according to claim 13, wherein the step of connecting the lengths of section is implemented by spot welds located between a single first contact face, or each first contact face, and the perimetric faces.

15. The method according to claim 14 wherein the spot welds are located between a first contact face and between co-planar perimetric faces of the frame.

16. The method according to claim 15, wherein the spot weld is located between two first contact faces of the square and the corresponding perimetric faces of the frame.

17. The method of claim 13 wherein the lengths of section and the connecting squares are made of steel.

* * * * *